United States Patent [19]

Worstell

[11] Patent Number: 5,600,144
[45] Date of Patent: Feb. 4, 1997

[54] THREE DIMENSIONAL IMAGING DETECTOR EMPLOYING WAVELENGTH-SHIFTING OPTICAL FIBERS

[75] Inventor: William A. Worstell, Framingham, Mass.

[73] Assignee: Trustees of Boston University, Boston, Mass.

[21] Appl. No.: 240,591

[22] Filed: May 10, 1994

[51] Int. Cl.[6] .................................................. G01T 1/20
[52] U.S. Cl. ...................................... 250/363.03; 250/367
[58] Field of Search .......................... 250/363.02, 363.03, 250/363.01, 366, 367, 368, 370.08, 370.11

[56] References Cited

U.S. PATENT DOCUMENTS

| | | |
|---|---|---|
| 4,743,764 | 5/1988 | Casey et al. |
| 4,831,263 | 5/1989 | Yamashita |
| 4,939,464 | 7/1990 | Hammer |
| 5,122,667 | 6/1992 | Thompson |
| 5,227,634 | 7/1994 | Ryuo et al. |
| 5,241,181 | 8/1993 | Mertens et al. |
| 5,391,878 | 2/1995 | Petroff |

OTHER PUBLICATIONS

"Decay time measurements on pure CsI Scintillators prepared by different methods", S. Keszthelyn-Landon, et al. *Nuclear instruments and methods in physics research* A303 (1991) pp. 374–380.

"CsI-Based Scintillators in y-Detection Systems", A. V. Gektin et al., *Nuclear Instruments and Methods in Physics Research* A292 (1990) pp. 591–594.

"A New Scintillation Material: Pure CsI With 10 ns Decay Time", Shinzou Kubota et al., *Nuclear Instruments and Method in Physics Research* A268 (1988) pp. 275–277.

"Readout Techniques and Radiation damage of Undoped Cesium Iodile", C. L. Woody et al., *IEEE Transactions on Nuclear Science*, vol. 37, No. 2, Apr. 19909, pp. 492–498.

"A New Type of Luminescence Mechanism in Large Band-Gap Insulators: Proposal for Fast Scintillation Materials", Shinzou Kubota et al, *Nuclear Instruments and Methods in Physics Research* A289 (1990) pp. 253–260.

"Progress and prospects in the development of new scintillators for future high energy physics experiments", P. Lecoq et al., *Nuclear Instruments and Methods in Physics Research* A315 (1992) pp. 337–343.

"Light Collection in Scintillation Detector Composites for Neutron Detection", Glenn F. Knoll et al. *IEEE Transactions on Nuclear Science*, vol. 35, No. 1, Feb. 1988, pp. 872–875.

"Monte Carlo Calculations of the Optical Coupling Between Bismuth Germanate Crystals and Photomultiplier Tubes", Stephen E. Derenzo et al., *IEEE Transactions on Nuclear Science*, vol. NS–29, No. 1, Feb. 1982, pp. 191–195.

"A Low-Z Pet Detector", C. A. Burnham, et al., *IEEE Transactions on Nuclear Science*, vol. 37, No. 2, Apr. 1990, pp. 832–824.

(List continued on next page.)

*Primary Examiner*—Jack I. Berman
*Assistant Examiner*—Richard Hanig
*Attorney, Agent, or Firm*—Baker & Botts, L.L.P.

[57] ABSTRACT

A novel detector element structure and method for its use is provided. In a preferred embodiment, one or more inorganic scintillating crystals are coupled through wavelength shifting optical fibers (WLSFs) to position sensitive photomultipliers (PS-PMTs). The superior detector configuration in accordance with this invention is designed for an array of applications in high spatial resolution gamma ray sensing with particular application to SPECT, PET and PVI imaging systems. The design provides better position resolution than prior art devices at a lower total cost. By employing wavelength shifting fibers (WLSFs), the sensor configuration of this invention can operate with a significant reduction in the number of photomultipliers and electronics channels, while potentially improving the resolution of the system by allowing three dimensional reconstruction of energy deposition positions.

27 Claims, 6 Drawing Sheets

OTHER PUBLICATIONS

"New Measurements of Scintillating Fibers Coupled to Multianode Photomultipliers", M. Salomon, *IEEE Transactions on Nuclear Science*, vol. 39, No. 4, 1992, pp. 671–673.

"A 5 Inch Diameter Position–Sensitive Scintillation Counter", Z. He et al., *IEEE Transactions on Nuclear Science*, vol. 40, No. 4, Aug. 1993, pp. 447–451.

"Embedded Waveshifting Fiber Readout of Long Scintillators", R. Wojcik, et al., *IEEE Transactions of Nuclear Science*, vol. 40, No. 4, Aug. 1993, pp. 470–475.

"High Pressure Gas Scintillation Drift Chambers with Wave–Shifter Fiber Readout", A. Parsons et al., *IEEE Transactions on Nuclear Science*, vol. 37, No. 2, Apr. 1990, pp. 541–546.

"Optimization of the Use of Small Inexpensive Side–Window Photomultiplier Tubes for Scintillator Readout", A. G. Weisenberger et al., Continuous Electron Beam Accelerator Facility.

"Large Area Real–Time System for Screening DNA Libraries", J. S. Gordon et al., *IEEE Transactions on Nuclear Science*, vol. 35, No. 5, Oct. 1992, pp. 1485–1489.

"Initial Characterization of a Prototype Multi–Crystal Cylindrical Spect System", Wei Chang et al., *IEEE Transactions on Nuclear Science*, vol. 39, No. 4, 1992, pp. 1084–1087.

"A High–Resolution Spect System Based on a Microchannel–Plate Imager", F. A. Dilmanian et al., *IEEE Transactions on Nuclear Science*, vol. 37, No. 2, Apr. 1990, pp. 687–695.

"Two Data Acquisition And Processing Systems For A Compact Gamma–Camera", Z. He et al. *IEEE Transactions on Nuclear Science*, vol. 40, No. 4, Aug. 1993, pp. 1165–1168.

"The Optimisation of Small CsI(Tl) Gamma–ray Detectors", A. J. Bird et al, *IEEE Transactions On Nuclear Science*, vol. 40, No. 4, Aug. 1993, pp. 395–399.

"Monte Carlo Optimisation of Depth–of–Interaction Resolution in PET Crystals", T. A. DeVol, et al. *IEEE Transactions on Nuclear Science*, vol. 40, No. 2, Apr. 1993, pp. 170–174.

"A Depth–Encoded PET Detector", P. Bartzakos et al. *IEEE Transactions on Nuclear Science*, vol. 38, No. 2, Apr. 1991, pp. 732–738.

"An Improved Multicrystal 2–D BGO Detector for PET", J. G. Rogers et al., *IEEE Transactions on Nuclear Science*, vol. 39, No. 4, 1992, pp. 1063–1068.

"A Positron Camera Detector Design with Cross–Coupled Scintillators and quadrant Sharing Photomultipliers", Wai–Hoi Wong, *IEEE Transactions on Nuclear Science*, vol. 40, No. 4, Aug. 1993, pp. 962–966.

"Development of a High Resolution PET", T. Yamashita et al., *IEEE Transactions on Nuclear Science*, vol. 37, No. 2, Apr. 1990, pp. 594–599.

"A New Generation of SPECT and PET Systems Based on Position Sensitive Photomultipliers", Manbir Singh et al., *IEEE Transactions on Nuclear Science*, vol. 37, No. 3, Jun. 1990, pp. 1321–1327.

"Imaging Properties of a Positron Tomograph with 280 BGO Crystals", Stephen E. Derenzo et al., *IEEE Transactions on Nuclear Science*, vol. NS–28, No. 1, Feb. 1981, pp. 81–88.

"High Resolution Positron Emission Tomography with a Prototype Camera Based on Solid State Scintillation Detectors", R. Lecomte et al., *IEEE Transactions on Nuclear Science*, vol. 37, No. 2, Apr. 1990, pp. 805–811.

"A Local Coincidence Triggering System for PET Tomographs Composed of Large–Area Position–Sensitive Detectors", D. A. Mankoff et al., *IEEE Transactions on Nuclear Science*, vol. 37, No. 2, Apr. 1990, pp. 730–736.

"The Donner 280–Crystal High Resolution Positron Tomograph", Stephen E. Derenzo et al, *IEEE Transactions on Nuclear Science*, vol. NS–26, No. 2, Apr. 1979, pp. 2790–2793.

"Performance Evaluation of the PC–2048: A New 15–Slice Encoded–Crystal PET Scanner for Neurological Studies", A. C. Evans et al., *IEEE Transactions on Medical Imaging*, vol. 10, No. 1, Mar. 1991, pp. 90–98. "A study of undoped CsI crystal", Zong–ying Wei et al., *Nuclear Instruments and Methods in Physics Research* A326 (1993) pp. 508–512.

"Scintillation characteristics of pure and Tl–doped CsI crystals", P. Schotanus et al., *IEEE Transactions on Nuclear Science*, vol. 37, No. 2, Apr. 1990, pp. 177–182.

"An Investigation on the Characteristics of Pure CsI Crystals", B. K. Utts et al, *IEEE*, 1990, pp. 134–138.

"Time–resolved XEOL spectroscopy of new scintillators based on CsI", A. N. Belsky, et al., American Institute of Physics, 1992.

"Cerium Fluoride a Scintillator for High–Rate Applications", D. F. Anderson, *Nuclear Instruments and Methods in Physics Research* A287 (1990), pp. 606–612.

"Characteristics of the New YA103: Ce Compared with BGO and GSO", S. I. Ziegler et al., *IEEE Transactions on Nuclear Science*, vol. 40, No. 2, Apr. 1993.

"Cerium–doped Lutetium Oxyorthosilicate: A Fast Efficient New Scintillator", C. L. Melcher et al., *IEEE Transactions on Nuclear Science*, vol. 39, No. 4, 1992, pp. 502–505.

"A Measurement of the Light Yield of Common Inorganic Scintillators", I. Holl et al., *IEEE Transactions on Nuclear Science*, vol. 35, No. 1, Feb. 1988, pp. 105–109.

"YA103: Ce–fast-acting scintillators for detection of ionizing radiation", V. G. Baryshevsky et al., *Nuclear Instruments and Methods in Physics Research* B58 (1991) pp. 291–293.

"Cerium Doped GSO Scintillators and its Application to Position Sensitive Detectors", H. Ishibashi et al., *IEEE Transactions on Nuclear Science*, vol. 36, No. 1, Feb. 1989, pp. 170–172.

"Stoichiometric Cerium Compounds as Scintillators, part I: CeF3", A. J. Wojtowicz et al., *IEEE Transactions on Nuclear Science*, vol. 39, No. 4, 1992, pp. 494–501.

"Cerium Fluoride, A New Fast, Heavy Scintillator", W. W. Moses et al., *IEEE Transactions on Nuclear Science*, vol. 36, No. 1, Feb. 1989, pp. 173–176.

"Scintillation Properties of Lead Sulfate", W. W. Moses et al., *IEEE Transactions on Nuclear Science*, vol. 39, No. 5, Oct. 1992, pp. 1190–1194.

"Search for New Inorganic Scintillators", G. Blasse, *IEEE Transactions on Nuclear Science*, vol. 38, No. 1, Feb. 1991, pp. 30–31.

"Monte Carlo Calculations of the Detection Efficiency of Arrays of NaI(Tl), BGO, CsF, Ge, and Plastic Detectors for 511 keV Photons", Stephen E. Derenzo et al, *IEEE Transactions on Nuclear Science*, vol. NS–28, No. 1, Feb. 1981, pp. 131–136.

"A New Approach to very High Resolution Mini–Brain PET Using a Small Number of Large Detectors", A. H. Cho et al., *IEEE Transactions on Nuclear Science*, vol. 37, No. 2, Apr. 1990, pp. 842–851.

"Design of the Neuro–ECAT: A High–Resolution, High Efficiency Positron Tomograph for Imaging the Adult Heat or Infant Torso", C. W. Williams et al., *IEEE Transactions on Nuclear Science,* vol. NS–28, No. 2, Apr. 1981, pp. 1736–1740.

"Measurement of the Coincidence Response of Very Thin BGO Crystals", K. Murthy, C. J. Thompson, I. N. Weinberg, F. M. Mako.

"Stimulation and Measurement of Spatial resolution in detection of Annihilation radiation with BGO Crystals", David McDaniel et al., General Electric Medical Systems.

"Effect of Increased Axial Field of View on the Performance of a Volume PET Scanner", Joel S. Karp et al., *IEEE Transactions on Medical Imaging,* vol. 12, No. 2, Jun. 1993, pp. 299–306.

"Physical Characteristics of the ECAT 953B/31: A New High Resolution Brain Positron Tomograph", B. Mazoyer et al., *IEEE Transactions on Medical Imaging,* vol. 10, No. 4, Dec. 1991, pp. 499–504.

"The Problem of Scatter Correction in Positron Volume Imaging", C. J. Thompson, *IEEE Transactions on Medical Imaging,* vol. 12, No. 1, Mar. 1993, pp. 124–132.

"Design Considerations for a Single Tube Gamma Camera", Nicholas J. Yasillo et al., *IEEE Transactions on Nuclear Science,* vol. 37, No. 2, Apr. 1990, pp. 609–615.

"High Resolution Block Detectors for PET", T. Yamashita et al., *IEEE Transactions on Nuclear Science,* vol. 37, No. 2, Apr. 1990, pp. 589–593.

"Performance of a PET Detector Module Utilizing an Array of Silicon Photodiodes to Identify the Crystal of Interaction", W. W. Moses et al., *IEEE Transactions of Nuclear Science,* vol. 40, No. 4, Aug., 1993, pp. 1036–1040.

"A High Resolution PET for Animal Studies", M. Watanabe et al. *IEEE Transactions on Medical Imaging,* vol. 11, No. 4, Dec. 1992, pp. 577–580.

"A Hadron Calorimeter with Wavelength Shifter Read–Out", O. Botner et al., *Nuclear Instruments and Methods* 179 (1981), pp. 45–54.

"An Electromagnetic Calorimeter with Scintillators Strips and Wavelength Shifter Readout", F. Barreiro et al., *Nuclear Instruments and Methods in Physics Research* A257 (1987) pp. 145–154.

"Characteristics of scintillating fiber electromagnetic calorimeters with wavelength–shifter readout", T. Arima et al., *Nuclear Instruments and Methods in Physics Research* A314 (1992) pp. 417–424.

"Prototype design, construction and test of a Pb/scintillator sampling calorimeter with wavelength shifter fiber optic readout", A. Benvenuti, et al., *IEEE Transactions on Nuclear Science,* vol. 40, No. 4, Aug. 1993, pp. 537–545.

"Testing of the Spatial Resolution and Efficiency of Scintillating Fiber PET Modules", R. C. Chaney et al., *IEEE Transactions on Nuclear Science,* vol. 39, No. 5, Oct. 1992, pp. 1472–1474.

"Test of a position–sensitive photomultiplier for fast scintillating fiber detector read–out", J. Bahr et al., *Nuclear Instruments and Methods in Physics Research* A330 (1993) pp. 103–114.

"A Nuclear Survey Instrument with Imaging Capability", R. H. Redus et al., *IEEE Transactions on Nuclear Science,* vol. 39, No. 4, 1993 pp. 948–951.

"Positron–Emission Tomography", Michel M. Ter–Pogossion et al., *Scientific American* #243, Oct. 1980, pp. 169–181.

"Positron Emission Tomography: Principles and Quantitation", Edward J. Hoffman et al., Division of Nuclear Medicine and Biophysics, Department of radiological Sciences, UCLA School of Medicine, and the Laboratory of Nuclear Medicine, Los angeles, California, pp. 237–285.

"Performance Evaluation of the PC–2048: A New 15–Slice Encoded–Crystal PET Scanner for Neurological Studies", A. C. Evans et al., *IEEE Transactions on Medical Imaging,* vol. 10, No. 1, Mar. 1991, pp. 1990–1997.

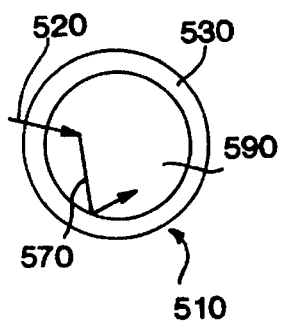
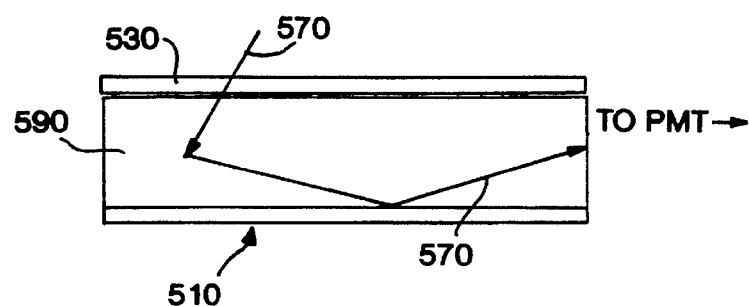
FIG. 5a  FIG. 5b
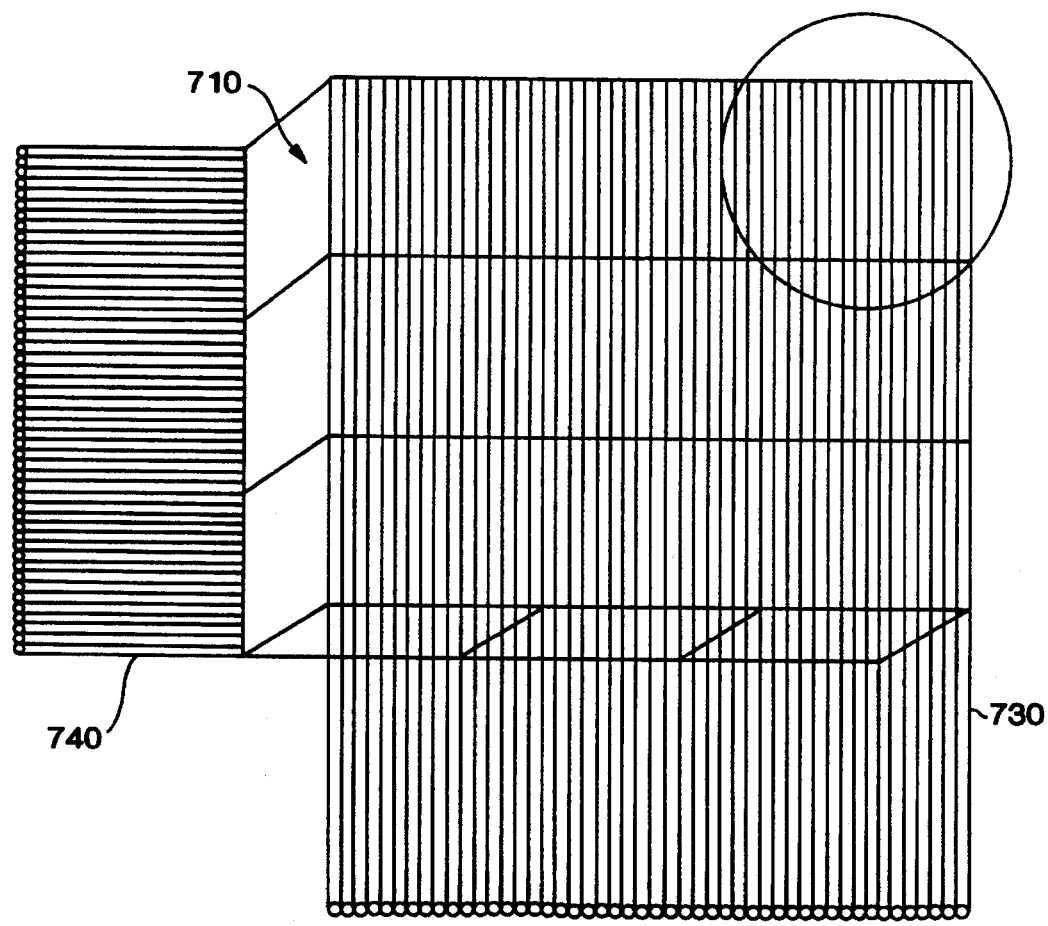
FIG. 6a

THREE DIMENSIONAL IMAGING DETECTOR EMPLOYING WAVELENGTH-SHIFTING OPTICAL FIBERS

This invention was made with Government support under Contract No. DE-FG02-91ER40676 awarded by the Department of Energy. The Government has certain rights in this invention.

FIELD OF THE INVENTION

This invention relates generally to a device and technique for detection and imaging of ionizing radiation and more specifically to a gamma ray detector employing inorganic scintillating crystals coupled to wavelength shifting optical fibers.

BACKGROUND OF THE INVENTION

Current nuclear medicine provides various techniques for non-invasive diagnosis of internal physical structures and biochemical processes occurring within a patient. Computerized axial tomography (CAT), magnetic resonance imaging (MRI) scans and conventional X-ray methods are examples of such structure-imaging systems. These techniques, which identify and localize only physical structures, suffer from the drawback that by the time an abnormality appears, and is detected, the pathological condition creating such an abnormality is often well advanced.

In contrast, positron-emission tomography (PET) systems are used to image functioning metabolic systems in the brain as well as the rest of the body. By imaging function rather than structure, these systems provide a unique complement to X-ray, CAT and MRI systems. PET is accomplished through the coincident detection of pairs of gamma rays. These gamma rays are produced when positrons emitted from the source (which is typically placed within the patient's body) annihilate with electrons in the tissues surrounding the source location. When the gamma rays are emitted at annihilation, the physical properties of these subatomic particles dictate that the two gamma rays are emitted at a single energy and with other known properties; for example, it is known that the gamma rays will be emitted such that they travel in directions very nearly opposite one another.

The PET imaging process includes a number of steps. Proton rich radioisotopes are first placed within the patient's body by, for example, injection or ingestion. In most cases these isotopes will be localized at or near the area where diagnosis is desired. Once incorporated into the body, the isotope continues to emit positrons as part of a naturally occurring decay process. The positron is an antielectron that, after traveling a short distance, will combine with an electron from the surrounding tissue and annihilate. On annihilation, the masses of both the electron and positron will be converted into electromagnetic radiation. In order to conserve energy and linear momentum, the electromagnetic radiation is in the form of two gamma rays which are of equal energy and which are emitted approximately 180 degrees to each other. It is this annihilation radiation that is detected externally in a PET device in order to measure both the quantity and the location of the positron emitter as it moves through the body.

The concentration of the radioisotope as it moves through and is processed by the patient's body can be measured and displayed as a cross section gray scale image. In this image, the intensity of each pixel (picture element) is proportional to the concentration of the radioisotope at that position within the body. This type of so called "kinematic" technique has been and will likely continue to be one of the most powerful methods for diagnosing and analyzing dynamic processes such as blood flow, substrate transport and biochemical reactions within the human body.

PET systems currently existing can record and process a large number of tomographic images of a human brain or torso simultaneously. Moreover, sensors can be placed either in a planar ring structure capable of forming a two dimensional image or in a volumetric layout to achieve a three dimensional image. The latter layout is termed positron volume imaging (PVI), although some authors will use the term "PET" when referring to PVI as well. PVI can be set up to process data initially as PET data, later combining planar images to form a volumetric image. Alternatively, PVI can be achieved by permitting inter-plane coincidences at the sensors and processing these coincident detections accordingly. The obtainable resolution with either of these systems has been recently narrowed to under one centimeter, and the distribution of radioactivity within the subject can be assessed to within a few percent.

In a typical PET implantation, a ring of gamma ray sensors are positioned to surround the patient in a position local to the radioisotope source. The detection process takes advantage of both the fact that gamma ray emission occurs at 180 degrees to each other and the fact that gamma rays are created simultaneously. Simultaneous or coincidence detection of the gamma ray by sensors on opposite sides of the patient places the site of the annihilation on or near a line connecting the centers of the two sensors. If only one detection takes place, then the annihilation has typically occurred outside of the volume or plane between the two detectors. In this case no event is recorded, since the source would be located outside of the diagnosed area.

An operational PET system typically includes the above described data acquisition subsystem including the radiation sensors and their associated circuitry, a fast computer with the necessary imaging software, and large amounts of memory for storing and processing sensor and other input data. A display system for immediate viewing of the image is also typically provided. Finally, a means for interactive processing and system control by the user is generally included.

As early as 1986, dozens of regional cyclotron-PET centers were in operation or under development worldwide, and that number continues to grow. A cyclotron-PET center typically consists of an accelerator (usually a small medical cyclotron) for generating radioisotopes, a positron emission tomograph (PET) and a chemistry laboratory for the synthesis of short-lived biological radiotracers. In the U.S., many such centers may be found at university-based medical research centers. The cost of a modern high resolution PET detector is more than $1 million, including approximately $100,000 for crystals and approximately $250,000 for photosensors (typically photomultipliers).

Since PET was first implemented in the 1970's, it has undergone successive refinements. Unfortunately, the newest high-resolution PET systems operate at or near the intrinsic limitations imposed by the physics of this technology. Statistical limits from limited patient exposure to positron-emitting radioisotopes and source position-smearing from positron range and residual momentum at annihilation serve to limit image resolution and accuracy. In addition, systems operating near this intrinsic limit are quite complex and very expensive. This is due, in part, to the requirement for a very large number of sensor elements to achieve the desired resolution.

Current PET detection techniques also suffer from various inaccuracies that result from decreases in crystal width as higher resolutions are sought. These inaccuracies are generally termed "imaging artifacts." One such artifact is that of radial blurring, which results from crystal penetration from sources away from the axis of the system. In other words, if the line of coincidence is located at some distance from the diameter of the detector ring, the gamma ray may pass through one or several crystals before being absorbed by the detecting crystal. This, in turn, causes a broadening of the coincidence aperture function towards the edges of the field of view. This problem is additionally complicated as the attenuation length of the crystal material increases. In order to achieve equivalent efficiency when using a crystal material having a longer attenuation length (where such crystal may have otherwise desirable properties such as high brightness, high speed, or low cost) the corresponding crystal depth must be increased. But once the crystal is deepened, radial blurring is increased. Even with crystals with the shortest attenuation lengths in current use, radial blurring limits system resolution for objects a few centimeters from the central axis of the detector. There have been various proposals made in an attempt to solve this problem, with the primary solution being the use of a depth of interaction measurement for the photons interacting within the detector.

Modern imaging systems have attempted to minimize imaging artifacts by using dense scintillation crystals such as bismuth germinate (BGO), by employing very narrow crystals, and by using specialized sensors to determine the particular location of interaction of the gamma ray in larger crystals. A variety of methods have been proposed to accomplish depth of interaction measurements in very high resolution PET detectors, but such measurements all have required either many additional photosensors (such as photodiodes) with their associated electronics, or complex coding schemes.

Another class of imaging instruments used in clinical nuclear medicine applications is that of single photon emission computed tomography (SPECT) systems. A detector used for SPECT can have many attributes in common with a PET detector, although position resolution requirements are typically much less demanding. In the SPECT imaging process, a radioactive tracer is first placed within the patient's body by injection or ingestion. This radioisotope decays by continually emitting low energy gamma rays (photons) as it travels throughout the patient's body. It is this photon radiation that is detected externally by the SPECT device. The photon radiation energy detected by SPECT devices is typically between the range of 55–400 keV, which is lower than the annihilation gamma's (511 keV) in PET systems. The most widely used radionuclide is an isomer of technetium, $_m^{99}$Tc, which has a half-life of 6 hours (the time required for exactly half of the radionuclide initially present to decay). The radionuclide decays by continually emitting gamma rays, in the case of $_m^{99}$Tc, the gamma energy being 140 keV. Some of the commonly used isotopes are listed here with the decay photon energy and corresponding bodily imaging function:

$^{201}$Tl, 80 keV; used for heart and tumor imaging.

$^{176}$Ta, 55–65 keV, used for imaging the heart.

$^{133}$Xe, 80 keV, used for lung and ventilation studies.

Conventional SPECT implementation calls for the use of a collimator, usually consisting of a thick lead sheet perforated with thousands of small holes, placed directly in front of a gamma camera (crystal detector). Generally, the collimator holes are perpendicular to the crystal so as to block the passage of obliquely incident photons to the crystal detector and to thereby select the direction of the incident photon. By rotating the gamma ray camera and/or the collimator around the patient, a series of two-dimensional projections can be formed from different directions. By applying various reconstruction techniques, the internal distribution of radioactive tracers can be recovered simultaneously for parallel two-dimensional transverse sections. This SPECT technique can then be used for three-dimensional imaging of radioactive tracer distributions located in the lungs, heart and brain. Conventional gamma cameras for use in SPECT generally employ from 36 to 90 photomultipliers as photosensors, with their associated readout electronics. In part due to this internal complexity, commercial SPECT systems range in cost from approximately $200,000 to $500,000.

SUMMARY OF THE INVENTION

It is therefore an object of the invention to provide a simplified gamma ray detector structure.

It is a further object of this invention to provide a detector structure with high image resolution.

It is a yet further object of this invention to decrease the number of sensor components and the resulting cost of each sensor element.

It is a still further object of this invention to increase the resolution of the imaging system while at the same time decreasing the number of sensor elements required.

It is a yet further object of this invention to provide depth of interaction measurements in order to alleviate imaging artifacts.

The above objects are accomplished by a novel detector element structure and method for its use which is described as follows. In a preferred embodiment, one or more inorganic scintillating crystals are coupled through wavelength shifting optical fibers (WLSFs) to position sensitive photomultipliers (PS-PMTs). The superior detector configuration in accordance with this invention is designed for an array of applications in high spatial resolution gamma ray sensing with particular application to SPECT, PET and PVI imaging systems. The design provides better position resolution than prior art devices at a lower total cost. By employing wavelength shifting fibers (WLSFs), the sensor configuration of this invention can operate with a significant reduction in the number of photomultipliers and electronics channels, while potentially improving the resolution of the system by allowing three dimensional reconstruction of energy deposition positions.

BRIEF DESCRIPTION OF THE DRAWINGS

FIG. 5(a) is an end view of a single WLSF;

FIG. 5(b) is a side view of the same single WLSF;

FIG. 6(a) illustrates a crystal array coupled to WLSF ribbons according to a preferred embodiment of this invention;

DESCRIPTION OF THE INVENTION

FIG. I illustrates an example of tracer kinetic modeling and the associated physics in forming a PET image. First, a chemical compound having the desired biological activity is labeled with a radioactive isotope and is introduced into the subject. As an example, in FIG. 1, a radioactive isotope of carbon monoxide 60 is used. Such a molecule could act as a tracer for hemoglobin by forming $^{11}$C-carboxyhemoglobin. For purposes of this discussion, it will be assumed that the subject is a human being composed of numerous materials, one of which is tissue 10. It should, however, be understood that the present invention can be employed to image any type of subject having active biological processes occurring internally therein.

Figure 1:
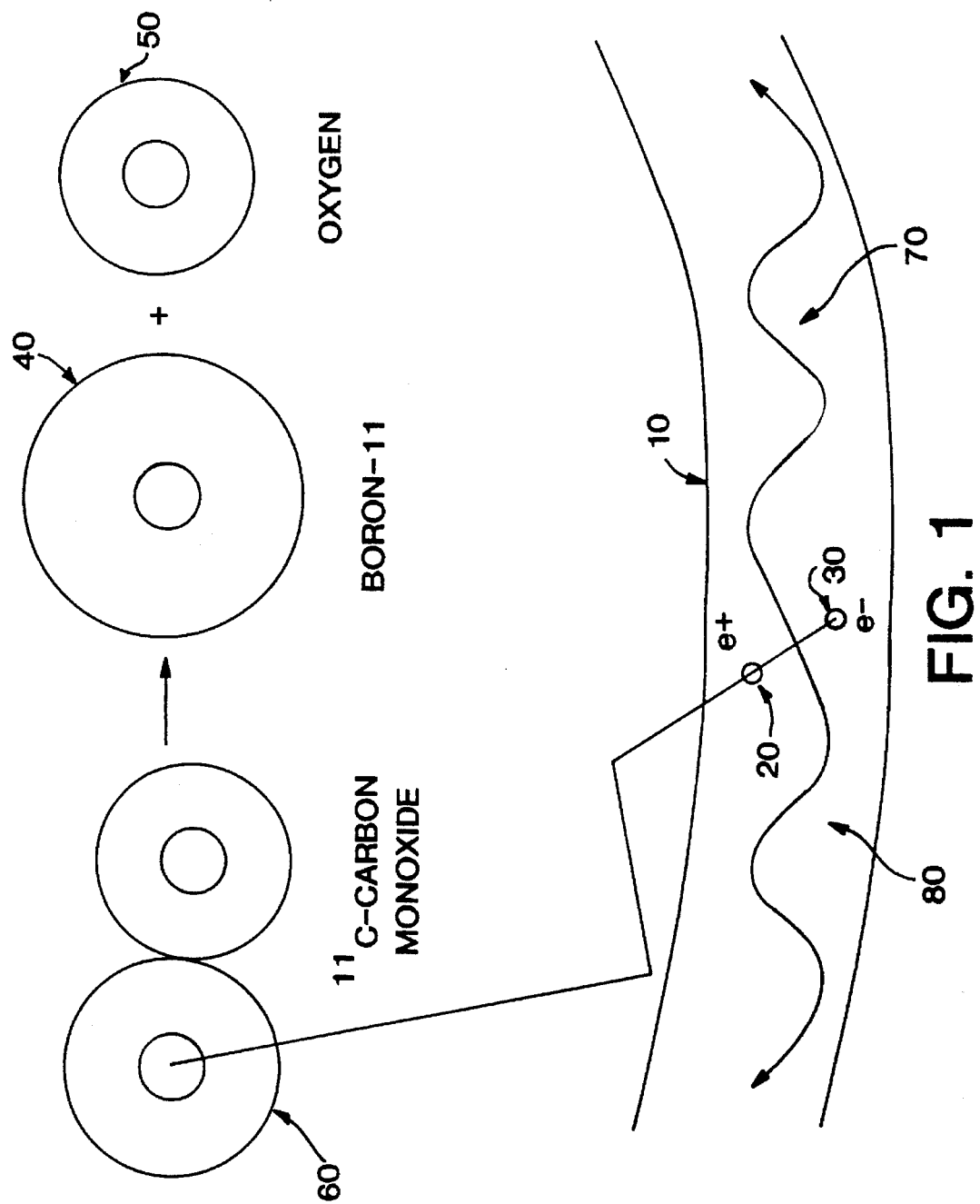
FIG. 1 is an illustration of the physical process by/which the PET technique functions.

As the radioactive isotope 60 is processed within the subject it is continually decaying by emitting positrons or positive electrons 20. In the example of FIG. 1, the $^{11}$C-carbon monoxide is disassociated to form $^{11}$B-boron 40 and oxygen 50. Once emitted, the positrons almost immediately combine with electrons 30 in the immediately surrounding tissue 10 of the subject. Each of the positrons 20 combines with one electron 30 such that the both particles are annihilated.

As a result of this annihilation, two gamma rays (each 511 keV) 70 and 80 are produced. These two gamma rays are emitted simultaneously in very nearly opposite directions. They pass through the tissue of the subject and are recorded externally by a large number of sensors which are the subject of this invention.

Figure 2:
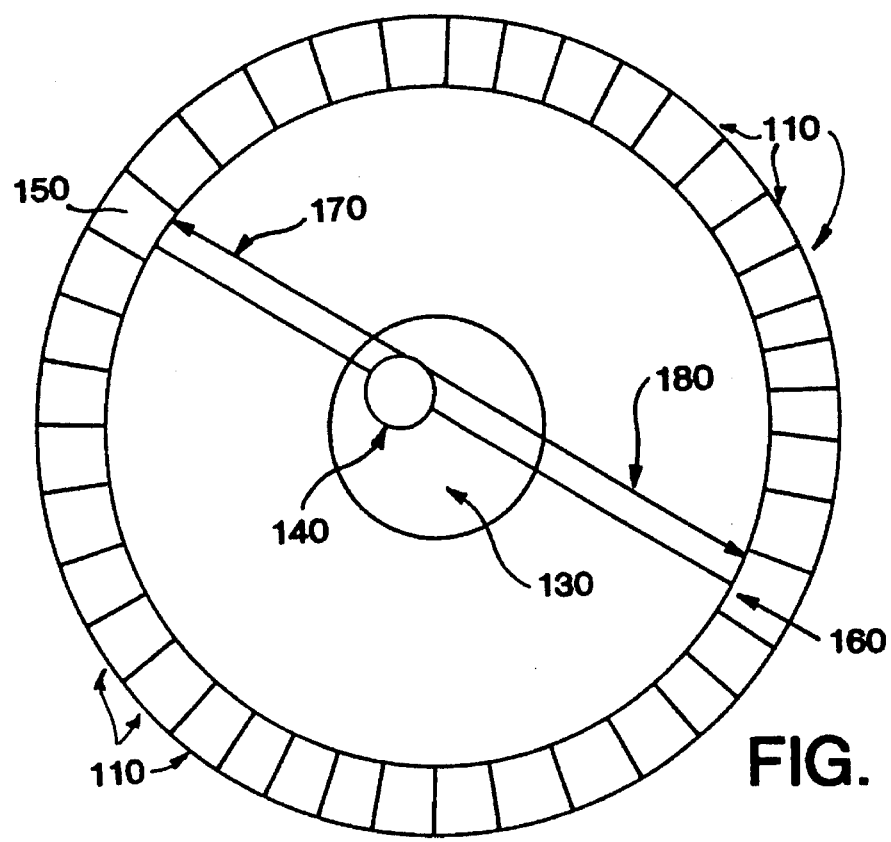
FIG. 2 is a diagrammatic illustration of a PET device into which the present invention may be embodied.

FIG. 2 illustrates a typical implementation of a PET device which may be used to image a radioisotope located within an object to be diagnosed. In this embodiment, gamma ray sensors 110 are formed in a ring structure so as to surround the object 130 being imaged. Radioactive isotope 140 is contained within object 130. While the figure shows a relatively small number of sensors 110, an operational system, in order to achieve a reasonably effective resolution, will have many more. It can be further seen that in this apparatus coincident sensors 150 and 160, respectively, concurrently detect gamma rays 170 and 180.

As mentioned above, the primary limitation in PET is spatial resolution. Ultimately, resolution is limited by the physics of the annihilation process. This includes positron range broadening of from 0.2 mm to 2.6 mm depending upon the particular radioisotope selected as the labeling material. Further, resolution is adversely affected by the gamma pair opening angle variation of 180° +/−0.3° which amounts to 1.4 mm to 2.8 mm at a detector separation of, for example, 50 cm and 100 cm respectively. Thus, it can be seen that PET resolution is theoretically limited to approximately 2 or 3 mm despite limitless numbers of sensors and/or expense of materials.

Many structures that are of interest for PET imaging are not much larger than 2 mm or 3 mm or are, in fact, somewhat smaller. This is especially true in many non-human (i.e., laboratory animal) applications. A requirement for fine spatial resolution is that the sensor be segmented at a scale comparable to the size of the objects being imaged. Therefore, a device limited by the physics of the PET process rather than the detector technology should have sensor cells with an effective size of 3 mm or less transverse to the gamma incident direction.

The succession of events in the operation of a preferred embodiment of this novel sensor is as follows:

A positron is emitted by a radioisotope within the object (patient) being imaged, which then annihilates within the surrounding tissue to produce back-to-back 511 keV annihilation gamma rays, or a radionuclide within the object being imaged decays to produce low energy gammas (50–400 keV).

Each gamma ray then interacts within an inorganic scintillating crystal, either through Compton scattering or photoabsorption. Energy deposition by the electron produced in the interaction results in the production of light in the crystal. The wavelength of the light produced in the crystal is an intrinsic property of the crystal. For example, the peak emission of sodium iodide (NaI) is 415 nm, while for cesium iodide (CsI) it is 310 nm.

The light produced in the crystal next propagates to the surface of the crystal. If it strikes the surface at glancing incidence, it is internally reflected and emerges on another crystal face. If it is travelling nearly perpendicular to the surface, it emerges from the crystal and enters a wavelength shifting optical fiber (WLSF). Light emerging from other crystal surfaces may be sensed with other techniques (such as direct optical coupling to a photosensor), or with other fibers.

The light entering a WLSF is absorbed, resulting in the emission of light with a different wavelength; the range of light wavelengths which are absorbed or emitted depends on the type of WLSF used. A typical WLSF absorbs blue light and emits green light although fibers with other optical behavior can also be used. For example, a fiber absorbing in the UV and emitting in the blue is also possible. An array (ribbon) of WLSFs encodes the position where the light emerged from the crystal and thereby encodes the location of the energy deposition. The WLSF ribbon then transmits a fraction of the wavelength-shifted light to a photosensor, with this photosensor typically less than 1 meter distant from the crystal.

At the photosensor, the energy deposition magnitude as encoded by the amount of WLSF light, and the position of energy deposition as encoded by the position of the wavelength shifted light within the ribbon, are sensed. If a position-sensitive photosensor is used, then the position where the light from the fiber ribbon entered the photosensor is encoded into electrical pulses. The time and amplitudes of these pulses also indicate the gamma arrival time and the amount of energy deposited into the crystal. Alternatively, individual photosensors may be used to sense light from single fibers or sets of fibers; by multiplexing fibers from separate ribbons on individual photosensors, the total number of photosensors required may be minimized.

TABLE 1

| | Properties of various inorganic scintillating crystals. | | | | | |
|---|---|---|---|---|---|---|
| | Density (g/cm³) | Radiation Length (cm) | Index of Refraction | Hydroscopic? | Rel. Light Output (NaI = 1.0) | Decay Time (ns) | Peak Emmission (nm) |
| NaI (Tl) | 3.67 | 2.59 | 1.85 | Yes | 1.00 | 230 | 415 |
| CsI (pure) | 4.53 | 1.86 | 1.80 | Slight | 0.10 | 10,36 | 310 |
| | | | | | 0.02 | >1000 | >400 |
| CsI (Tl) | 4.53 | 1.86 | 1.80 | Slight | 0.40 | >1000 | 550 |
| BGO | 7.13 | 1.11 | 2.15 | No | 0.20 | 300 | 480 |
| BaF$_2$ | 4.90 | 2.10 | 1.56 | Slight | 0.05 | 0.6 | 220 |
| | | | | | 0.20 | 620 | 310 |
| YAlO$_2$ Ce | 5.35 | 2.63 | 1.94 | No | 0.49 | 31 | 380 |
| LSO | 7.40 | 1.14 | 1.82 | No | 0.75 | 40 | 420 |

The novel detector configuration disclosed herein includes an inorganic scintillating crystal. Table 1 provides a partial list of common and newly developed inorganic scintillating crystals, along with their intrinsic characteristics. It will be understood that any of the crystal materials shown in Table 1, as well as others, may be employed to practice the invention described herein. A preferred embodiment for PET applications may incorporate LSO, while a preferred embodiment for SPECT applications may be NaI(T1). The choice of an optimal crystal for a given application of this technique involves considerations of light yield/energy resolution requirements, speed requirements, crystal cost, and simplicity of detector construction.

The sensor structures further employ wavelength shifting optical fibers (WLSFs) to couple to and read out the scintillating crystal. The choice of WLSF is determined by matching the light emission of the crystal to the light absorption of the fiber. Detailed optimization must be done in order to meet the requirements of the performance as dictated by the use of a particular device, e.g., mobile gamma ray camera, SPECT detector, or PET detector. In general, however, the novel detector configuration functions similarly independent of the particular choice of crystal and of WLSF.

Figure 3:
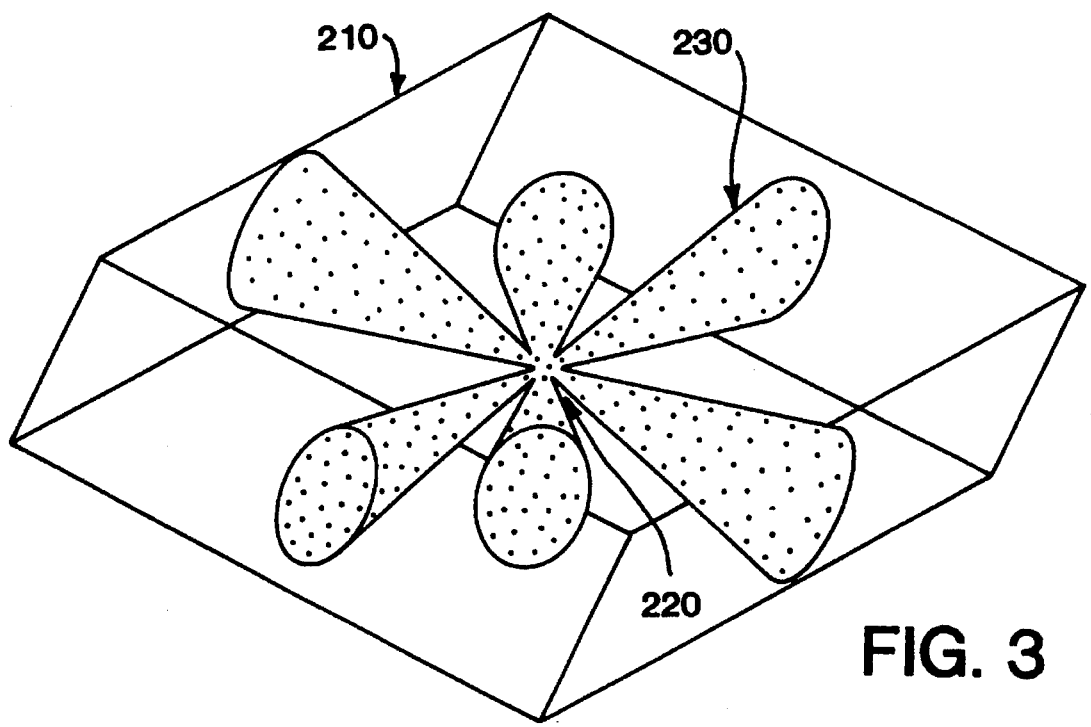
FIG. 3 is a diagrammatic illustration of the cones of direct light in an inorganic scintillation crystal.

As noted earlier, this technique may be used either to identify which of a set of very small crystals contained a gamma ray interaction, or to locate where within a larger crystal a gamma ray interaction occurred. In a preferred embodiment of this invention, scintillation light which is produced within the scintillating crystal by an ionizing electron (which is in turn produced by an incident annihilation gamma ray or a low energy gamma ray through either Compton scattering or photocapture) is emitted isotropically within the crystal. The fraction of the light which strikes the polished crystal face at an angle greater than the critical angle (determined by the index of refraction of the crystal) with respect to the surface normal is totally internally reflected within the crystal. The distribution of the remaining, non-reflected light on the surface of the crystal is shown in FIG. 3. This light 230 provides information on the position of the energy deposition 220 within the crystal 210, as discussed below. The direct light 230 which exits the crystal 210 provides useful information regarding the timing and amount of energy deposition 220 occurring within the crystal 210.

Figure 4A:
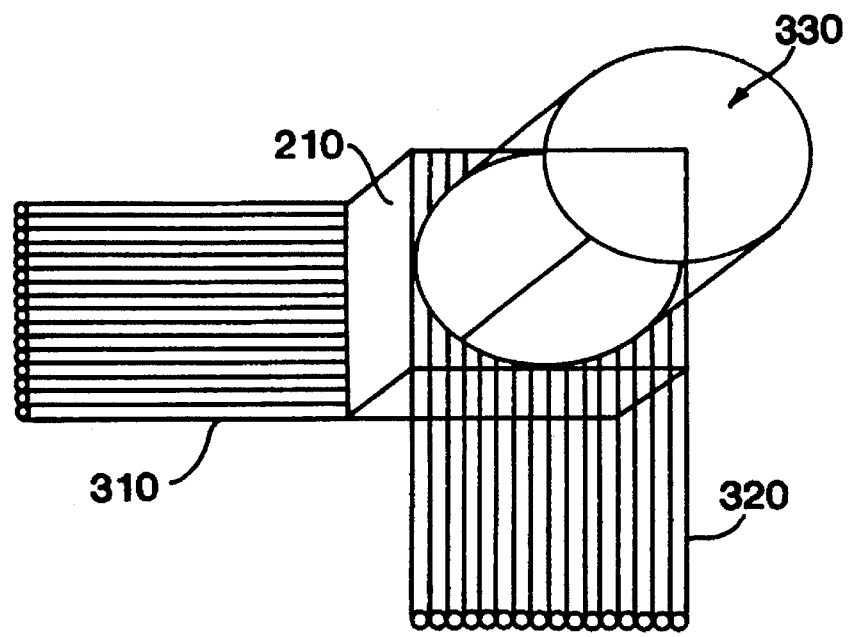
FIGS. 4(a) and 4(b) illustrate a scintillation crystal coupled to a WLSF readout in accordance with a first embodiment and a second embodiment, respectively, of the present invention.
Figure 4B:
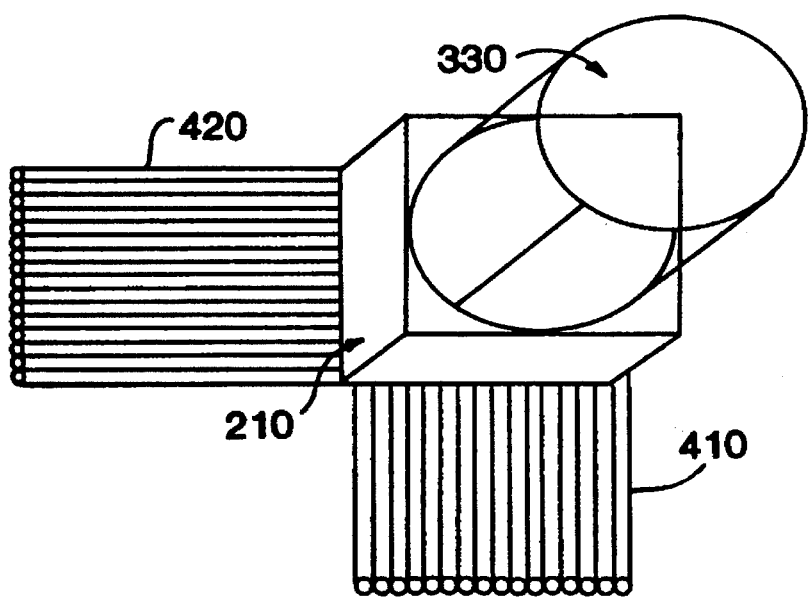

FIGS. 4(a) and 4(b) show alternative embodiments of the placement of the WLSFs with respect to the crystal. Totally internally reflected light may be reflected from other crystal faces, and may eventually exit from another crystal surface. More than one surface of the crystal 210 may be equipped with fiber-ribbon readout; by arranging two ribbons 310 and 320 at right angles on opposite sides of a given crystal (as shown in FIG. 4(a)), the energy deposition location 220 may be determined in two dimensions. Alternatively, partially translucent WLSFs may be used (as shown in FIG. 4(b)), so that both orthogonal fiber ribbons 410 and 420 may be placed on single side of crystal 210. In addition to sensing that fraction of the light which is transmitted down the WLSF, light which is not trapped within the fiber optic (as discussed below) may be sensed by one or more photosensors 330 coupled to the WLSF ribbons 310 and 320 or 410 and 420. By using one photosensor 330 directly coupled to the crystal 210 or to the WLSF ribbon at the location where the WLSF contacts the crystal 210, and a second photosensor at the end of the WLSF light pipe (not shown), it is possible to separate the functions of energy depositions amplitude measurement (direct coupling) from energy deposition localization (piped measurement). In a preferred embodiment for gamma cameras or SPECT, perpendicular fiber ribbons are read out by a position-sensitive photomultiplier, with one such fiber ribbon sandwiched between the crystal and a second photomultiplier.

Referring to FIGS. 5(a) and 5(b), an end view and a side view, respectively, of an individual WLSF as used herein, is illustrated. WLSFs combine an optical waveguide with a dopant chemical. The dopant chemical is selected such that it absorbs short wavelength light and re-emits longer wavelength light in a manner such that each absorbed photon provides a corresponding emitted photon. A fraction of the re-emitted light is captured within the total internal reflection aperture of the optical sensor such as the position-sensitive photomultiplier tube used in a preferred embodiment herein.

As shown in FIGS. 5(a) and 5(b), an incident photon 520 is absorbed after passing through fiber cladding 530 of fiber 510. Once absorbed, a portion of the light is totally internally reflected and a re-emitted photon 570 is transmitted through fiber 510 within fiber core 590.

Plastic WLSFs are manufactured by several vendors worldwide and are frequently assembled into ribbons one fiber thick and many fibers wide. One such vendor is the Bicron Corporation in Newbury, Ohio. A suitable WLSF for the use herein is the BCF-92 fibers (in ribbon form) manufactured by Bicron although others may be substituted without departing from this invention. The efficiency for the absorption and re-emission of light incident on a 1.0 mm thick fiber may approach 90%, with an attenuation length of 2 mm for the light which is optically captured along the fiber axis. It will be understood by one of ordinary skill in the art that of the light exiting the crystal, on 8% will be optically transmitted toward the fiber ends for use in readout. For the Bicron BCF-92 fibers, the peak absorption wavelength is 405 nm and the peak of the emission spectrum is at 494 nm. The refractive index of the core is 1.60, while that of the cladding is 1.49. Light yield may further be increased by utilizing doubly clad fibers which have a second low index cladding outside the first. This typically results in capture fractions which are approximately 50% higher than an equivalent singly clad fiber.

Figure 6B:
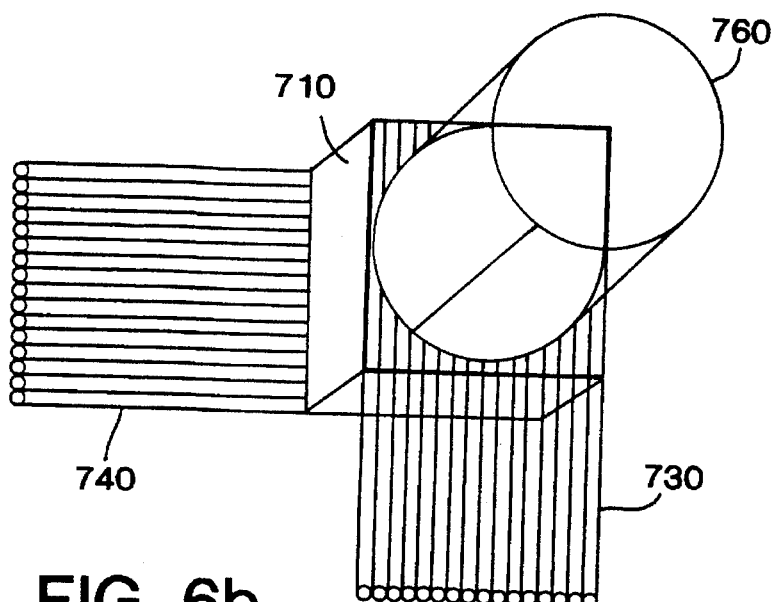
FIG. 6(b) is a detailed view of one crystal coupled to WLSF according to the embodiment of FIG. 6(a)
Figure 6C:
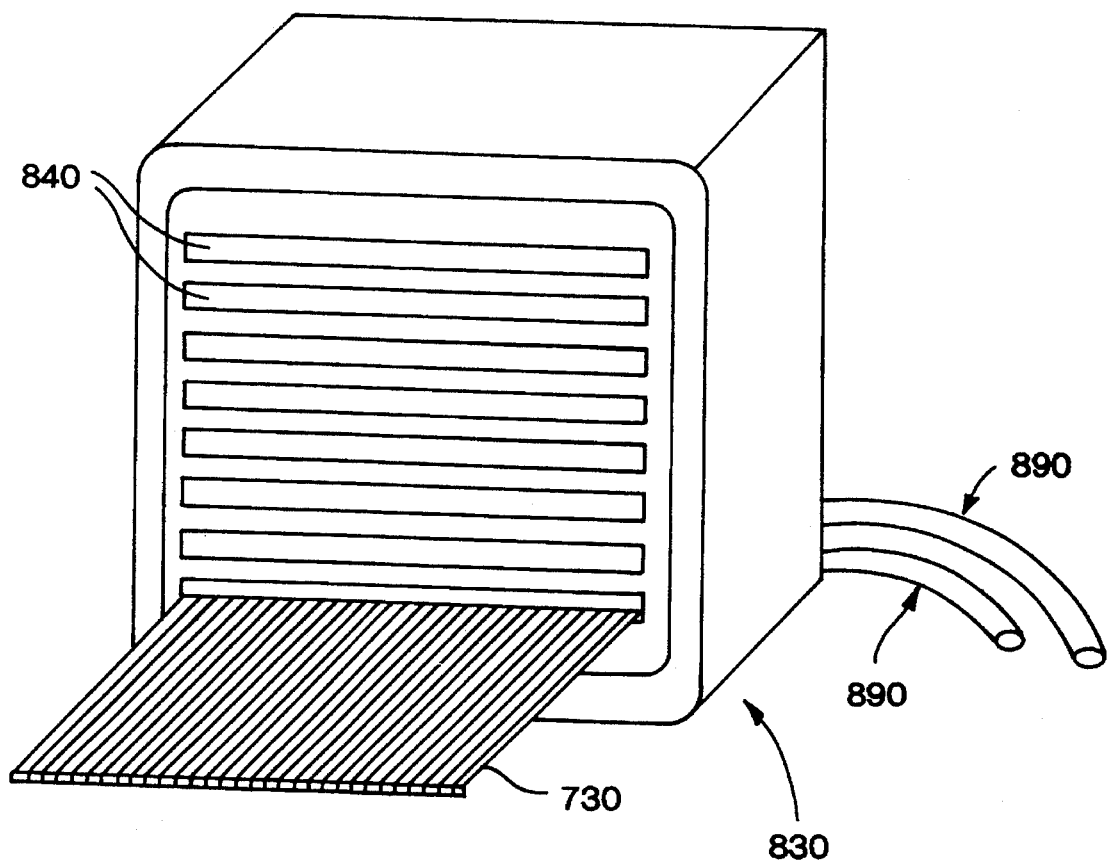
FIG. 6(c) illustrates a multianode PS-PMT coupled to a WLSF readout according to a preferred embodiment of the invention herein.

FIGS. 6(a), 6(b) and 6(c) collectively illustrate a preferred embodiment of a detector design for a gamma ray camera. This embodiment consists of a 3×3 array of optically isolated (meaning the crystal contact surfaces have either specular or diffuse reflectors between them) inorganic scintillating crystals 710 measuring 12 cm square by 1 cm deep. Thus, the crystal array in a preferred embodiment, measures 36 cm×36 cm by 1 cm deep. The crystal array is placed between two perpendicular wavelength shifting fiber ribbons 730 and 740. In this manner, information on the location (in both the x and y directions), time and magnitude of energy deposition may be transferred from the crystals 710, wavelength shifted and captured within the WLSFs 730 and 740. The light is then propagated through the WLSFs 730 and 740 to a photosensor 830. Light yield can be increased either by reading out both ends of the WLSFs 730 and 740 with the same photosensor 830 or by mirroring one end of the WLSF 730 and 740. FIG. 6(a) illustrates an embodiment having mirrored fiber ends.

FIG. 6(b) shows, in detail, a close-up of the 12 cm square×1 cm deep crystal indicated by a circle in FIG. 6(a). The WLSF ribbon used in a preferred embodiment of this invention is a pair of 1 mm×60 mm ribbons 730 on one surface of a 12 cm×12 cm×1 cm crystal 710, and another pair of identical WLSF ribbons 740 on the opposite crystal face, with the second pair oriented at 90 degrees with respect to the first. Alternatively, a single WLSF ribbon wide enough to cover the crystal face may be used. For obtaining a direct coupling readout of the energy deposition in the crystal 710, a photomultiplier 760 is placed directly on top of one set of the orthogonal WLSF ribbons 710, as shown in FIG. 6(b). Although not shown in FIGS. 6(a) and 6(b), additional WLSF ribbons may be placed on the remaining small area faces of the crystals 710 in order to gather the abovementioned totally internally reflected light. While relatively short sections of WLSFs are shown in the figures, it will be understood that the actual ribbons used may be as long as 100 cm.

A position sensitive photomultiplier (PS-PMT) 830 is shown in FIG. 6(c). In a preferred embodiment of this invention, an X-Y PS-PMT readout is used; this results in reduced channel count, finer position resolution and greater efficiency than in prior art devices in which scintillators are coupled directly to PS-PMTs. Alternatively, a pixillated type of PS-PMT could be used in high event-rate applications. In a specific implementation of an embodiment using the X-Y PS-PMT, the Hamamatsu 4 135-01 PS-PMT may be employed. This device is currently available from the Hamamatsu Corporation which is located in Hamamatsu, Japan. In the PS-PMT device, up to 3 ribbons of 1.0 mm×60 mm WLSF may be coupled to each of the 8 input regions 840 on this PS-PMT 830. While the operation of the PS-PMT, in general, is known in the art, a brief description is provided herein as follows.

When the output light carried from the WLSF 730 reaches a photocathode, the photocathode is caused to emit photoelectrons. The photoelectrons are applied to a group of dynodes where they are subjected to photomultiplication while maintaining their spatial spread. Next, they are applied to a resistive division type anode having a plurality of output terminals. The incident position and the quantity of the photoelectrons are output as data though the output terminals. U.S. Pat. No. 4,929,835 to Emaciate describes additional details on this process.

By measuring the ratio of the charge in the two pulses associated with each input region, the coordinate across the ribbon 730 (along the 60 mm width) may be reconstructed to within 2 mm. Each of the 8 input regions 840 within the PS-PMT 830 is capable of encoding information from 3 ribbons. One 3×3 array of crystals contains a total of 12 WLSF ribbons, with each ribbon measuring 1 mm thick and 60 mm across. The photomultiplier 830 further includes two signal lines 890 (change division readout) that provide the data to additional processing elements.

It should be noted that although a preferred embodiment of the invention herein has been described in the context of a PS-PMT (either X-Y or pixillated), it is possible to substitute other photosensors for the PS-PMT. In particular, photodiodes, avalanche photodiodes, or hybrid photodiodes (photocathode/photodiode combinations) are all possible configurations for achieving the objects of this invention. The concentration of light within WLSF makes possible a device with smaller photocathode readout area than with the prior art methods, thereby providing the ability to employ smaller photosensors having finer spatial resolution.

In addition to providing fine traverse and axial spatial resolution, the inorganic scintillating crystal WLSF/PS-PMT detector can readily measure the depth of interaction in the crystals. For high resolution detector applications, depth of interaction ambiguities lead to imaging artifacts (radial elongation) for positron source positions at some distance from the axis of the ring. By orienting readout fiber ribbons with their 60 mm widths along the depth-of-interaction axis, we may use the technique described above to measure the depth of interaction in a crystal (or in any of several crystals which are read out in parallel by the fiber ribbon). A 5 mm FWHM (Full Width Half Max.) depth of interaction resolution is sufficient to completely eliminate radial elongation in PET applications, while a 3 mm depth of interaction resolution is readily obtainable with WLSF ribbon readout.

Figure 7:
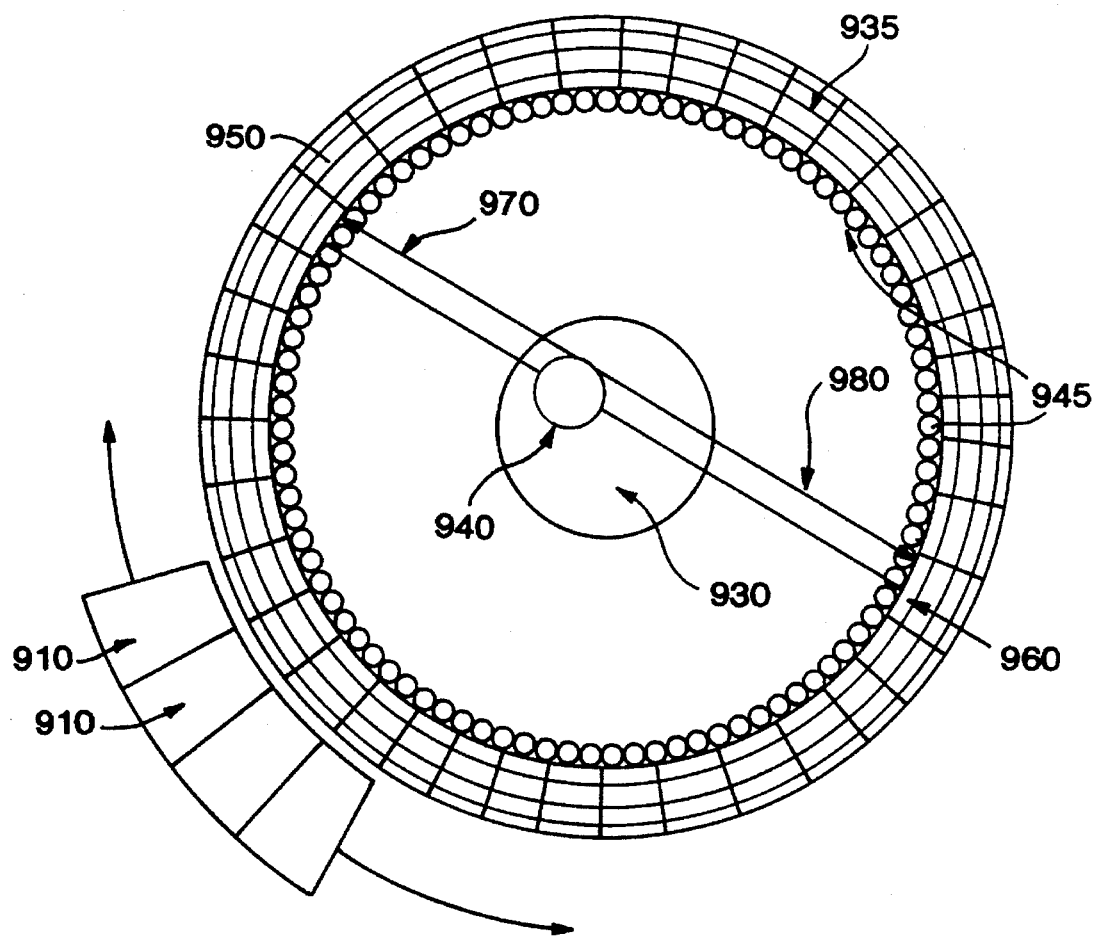
FIG. 7 illustrates a preferred embodiment of the invention as employed in a PET application.

A preferred embodiment of the inorganic crystal WLSF/PS-PMT detector for PET applications is illustrated in FIG. 7. In this embodiment, direct readout photosensors 910 are formed in a ring structure so as to surround the object 930 being imaged. Radioactive isotope 940 is contained within object 930. While the figure shows a relatively small number of direct readout photosensors 910, an operational system, in order to achieve a reasonably effective resolution, will have many more. It can be seen that in this apparatus coincident sensors 950 and 960, respectively, concurrently detect gamma rays 970 and 980.

The functions of energy and timing measurement (direct readout) and localization (fiber readout) are separated. Several PET rings (separate units duplicated along the central axis of the ring) may be read out with a single set of axial fibers 945. Circumferential fibers 935 may perform depth-of-interaction measurements for each PET ring separately. For ultra-high precision PET, a single axial fiber can be used to read out each optically isolated crystal, which may be 1 mm in width or less. Such a PET detector has superior resolution to current art at lower system cost.

Application of the inorganic scintillating crystal/WLSF/PS-PMT detector configuration is not limited to medical imaging alone. Applications to astrophysics, experimental nuclear physics, commercial nuclear reactors, and biomedical imaging of a radioisotope-labelled materials are possible. In the astrophysics and nuclear experiment examples, a large-area gamma camera could be implemented at low cost using inorganic crystals and wavelength-shifting fibers. For nuclear reactors and other installations involving radioactive materials this technique may be incorporated in imaging devices used to locate sources of radiation, again improving system sensitivity while lowering costs. Radioisotopes are commonly used in biomedical research to label research biochemicals; imaging radiation detectors used for this purpose may again be upgraded in sensitivity and decreased in cost by using the proposed simplified readout technique. In all such applications, the decreased number (and area) of photosensors and their associated electronics results in either costs savings or increased detector size and sensitivity. In addition, the use of wavelength shifting fibers in combination with inorganic crystal scintillators is not limited to the imaging of gamma radiation alone; other forms of ionizing radiation such as alpha and beta particles, neutrons, protons, and nuclear fragments can all be imaged at decreased system cost and increased sensitivity.

While the invention has been particularly described with reference to particular embodiments thereof, it will be understood by those skilled in the art that various other changes in detail may be made therein without departing from the spirit, scope or teachings of this invention.

What is claimed:

1. A radiation detector comprising:
    a plurality of wavelength shifting fibers;
    one or more inorganic scintillators, each of said scintillators directly coupled to at least one of said wavelength shifting fibers;
    photosensor means coupled to said wavelength shifting fibers for determining the time and position of energy deposition within one or more of said scintillators.

2. The detector of claim 1 wherein said radiation is gamma rays and said photosensor means determines the occurrence of a gamma ray interaction within one or more of said scintillators.

3. The detector of claim 1 wherein said inorganic scintillators are crystals and a said wavelength shifting fibers are coupled to each of said crystals on more than one face of said crystals.

4. The detector of claim 3 wherein groups of said wavelength shifting fibers are integrally formed as a ribbon and two of said ribbons are arranged at right angles on opposite sides of each crystal.

5. The detector of claim 3 wherein groups of said wavelength shifting fibers are integrally formed as a partially translucent ribbon and two of said ribbons are arranged at right angles on a single side of each crystal.

6. The detector of claim 1 further including a photosensor directly coupled to each of said inorganic scintillators for determining energy deposition amplitude measurement.

7. The detector of claim 1 wherein said scintillators are composed of sodium iodide.

8. The detector of claim 1 wherein said scintillators are composed of cesium iodide.

9. The detector of claim 1 wherein said scintillators are composed of bismuth germanium oxide.

10. The detector of claim 1 wherein said scintillators are composed of lutetium oxyorthosilicate.

11. The detector of claim 1 wherein said photosensor means is a position sensitive photomultiplier.

12. The detector of claim 1 where said photosensor is an X-Y readout device.

13. The detector of claim 1 wherein photosensor is a pixillated readout device.

14. The detector of claim 1 wherein said photosensor means is one or more photodiodes.

15. The detector of claim 1 wherein said photosensor means includes a photodiode and a photocathode.

16. The detector of claim 1 wherein each of said plurality of wavelength shifting fibers are mirrored at one end.

17. The detector of claim 1 wherein said photosensor means is coupled to each of said wavelength shifting fibers at each of both ends of said wavelength shifting fiber.

18. The detector of claim 1 wherein said wavelength shifting fibers are doubly clad.

19. The detector of claim 1 wherein said scintillators comprise a plurality of generally flat crystals transmitting direct light on their large area faces into said wavelength shifting fibers.

20. The detector of claim 1 wherein said scintillators comprise arrays of optically isolated crystals transmitting both totally internally reflected light and direct light on each of their faces into said wavelength shifting fibers.

21. A positron emission tomographic scanner for sensing and measuring biochemical and physiological changes in a living organism following the administration of a radioactive compound into said living organism, said scanner comprising:
    scintillation means disposed surrounding said living organism;
    photodetector means disposed at a location removed from said scintillation means;
    at least one wavelength shifting fiber, each of said wavelength shifting fibers absorbing, re-emitting, and transmitting light from said scintillation means to said photodetector means; and
    means for reconstructing an image representing the concentration of said radioactive compound at various locations within said living organism.

22. The scanner of claim 21 wherein said photodetector means is a position sensitive photomultiplier.

23. The scanner of claim 21 wherein said scintillation means comprises a plurality of inorganic crystals wherein said crystals are grouped so as to be associated with a particular position sensitive photomultiplier.

24. A scintillation camera for gamma ray imaging applications, said scintillation camera comprising:
    an inorganic crystal scintillator disposed at a location removed from an object being imaged;
    photodetector means disposed at a location removed from said scintillation means;
    at least one wavelength shifting fiber, each of said wavelength shifting fibers absorbing, re-emitting, and transmitting light from said scintillation means to said photodetector means; and
    means for reconstructing an image representing the concentration of said gamma rays within said object being imaged.

25. The scintillation camera of claim 24 wherein said photodetector means is a position sensitive photomultiplier.

26. A method for reconstructing the position of a radioactive source located within a living organism through coincident detection of gamma ray pairs comprising the steps of:
    introducing said radioactive source into a subject which is to be imaged;
    sensing from a location external to a said subject, each gamma ray of said gamma ray pairs through the interaction of said gamma ray within a scintillating crystal;

propagating light energy generated as a result of said interaction within said scintillation crystal through a wavelength shifting optical fiber;

determining as a result of a location of said wavelength shifting optical fiber, a position of said interaction of said gamma ray within a scintillating crystal; and reconstructing an image representing the concentration of said radioactive source at various locations within said living organism.

27. A method for determining the depth of interaction and amount of energy deposition within a scintillating crystal comprising the steps of:

producing scintillation light within said scintillation crystal;

providing a first photosensor directly coupled to said scintillation crystal;

providing a second photosensor coupled through at least one wavelength shifting fiber to said scintillation crystal;

processing direct light at said first photosensor to determine the amount of energy deposition within said scintillation crystal;

processing totally internally reflected light at said second photosensor to determine the depth of interaction within said scintillation crystal.

* * * * *